United States Patent
Wang

(10) Patent No.: US 9,722,453 B2
(45) Date of Patent: Aug. 1, 2017

(54) TOUCH SCREEN, ELECTRONIC DEVICE, AND WIRELESS CHARGING METHOD

(71) Applicant: Lenovo (Beijing) Co., Ltd., Beijing (CN)

(72) Inventor: Yanru Wang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 213 days.

(21) Appl. No.: 14/613,938

(22) Filed: Feb. 4, 2015

(65) Prior Publication Data

US 2016/0087482 A1   Mar. 24, 2016

(30) Foreign Application Priority Data

Sep. 24, 2014   (CN) .......................... 2014 1 0491942

(51) Int. Cl.
*H02J 7/00*  (2006.01)
*H02J 7/02*  (2016.01)
(Continued)

(52) U.S. Cl.
CPC ............... *H02J 7/025* (2013.01); *G06F 1/16* (2013.01); *G06F 3/041* (2013.01); *H02J 5/005* (2013.01); *H02J 7/0052* (2013.01); *H02J 50/10* (2016.02)

(58) Field of Classification Search
USPC ....................................................... 320/108
See application file for complete search history.

(56) References Cited

U.S. PATENT DOCUMENTS 3,770,985 A  *  11/1973  Meijer ................. H03K 5/2463
                                                          327/60
4,928,308 A  *   5/1990  Roessler ................. H04B 3/23
                                                          370/291
(Continued)

FOREIGN PATENT DOCUMENTS

CN      102654801 A     9/2012
CN      103412670 A    11/2013
(Continued)

OTHER PUBLICATIONS

First Chinese Office Action regarding Application No. 201410491942.4 dated Oct. 9, 2016. English translation provided by Unitalen Attorneys at Law.
(Continued)

*Primary Examiner* — Samuel Berhanu
(74) *Attorney, Agent, or Firm* — Harness, Dickey & Pierce, P.L.C.

(57) ABSTRACT

A touch screen, an electronic device, and a wireless charging method are provided. The touch screen includes: a substrate adapted to carry a touch sensor circuit, where the touch sensor circuit includes a first touch sensor circuit and a second touch sensor circuit; and an equivalent switch arranged between the first touch sensor circuit and the second touch sensor circuit, where the first touch sensor circuit and the second touch sensor circuit form the touch sensor circuit in a case that the equivalent switch is off; and the first touch sensor circuit and the second touch sensor circuit form an equivalent coil and two ends of the equivalent coil are connected to a rechargeable power supply to generate an induced current for charging the rechargeable power supply, in a case that the equivalent switch is on.

12 Claims, 3 Drawing Sheets

(51) Int. Cl.
*G06F 3/041* (2006.01)
*G06F 1/16* (2006.01)
*H02J 5/00* (2016.01)
*H02J 50/10* (2016.01)

(56) References Cited

U.S. PATENT DOCUMENTS

| | | | | |
|---|---|---|---|---|
| 5,221,926 A * | 6/1993 | Jackson | ............ | H03M 1/0665 |
| | | | | 341/118 |
| 5,281,822 A * | 1/1994 | Albrecht | ............... | G01T 3/08 |
| | | | | 250/370.05 |
| 5,642,116 A * | 6/1997 | Gersbach | ............ | H03M 1/1052 |
| | | | | 341/120 |
| 6,927,719 B1 * | 8/2005 | Siniscalchi | ......... | H03M 1/0604 |
| | | | | 341/144 |
| 7,271,505 B1 * | 9/2007 | Miettinen | ............ | H02J 7/0018 |
| | | | | 307/110 |
| 9,030,421 B2 | 5/2015 | Tseng et al. | | |
| 2007/0047100 A1 * | 3/2007 | Takahashi | ............ | H02J 9/061 |
| | | | | 359/689 |
| 2009/0140692 A1 * | 6/2009 | Hwang | ............... | G08C 17/04 |
| | | | | 320/108 |
| 2012/0249449 A1 | 10/2012 | Tseng et al. | | |
| 2014/0015337 A1 | 1/2014 | Takeuchi et al. | | |
| 2014/0035378 A1 | 2/2014 | Kesler et al. | | |
| 2014/0232325 A1 | 8/2014 | Jung et al. | | |

FOREIGN PATENT DOCUMENTS

| | | |
|---|---|---|
| CN | 103503276 A | 1/2014 |
| CN | 103518175 A | 1/2014 |
| CN | 103997075 A | 8/2014 |

OTHER PUBLICATIONS

Second Chinese Office Action regarding Application No. 201410491942.4 dated May 15, 2017. English translation provided by Unitalen Attorneys at Law.

* cited by examiner

TOUCH SCREEN, ELECTRONIC DEVICE, AND WIRELESS CHARGING METHOD

This application claims priority to Chinese Patent Application No. 201410491942.4, entitled "TOUCH SCREEN, ELECTRONIC DEVICE, AND WIRELESS CHARGING METHOD", filed with the Chinese Patent Office on Sep. 24, 2014, which is incorporated by reference in its entirety herein.

TECHNICAL FIELD

The present application relates to the field of charging, particularly to a touch screen, an electronic device, and a wireless charging method.

BACKGROUND

Currently, rechargeable batteries may be used as power supplies for most of portable electronic devices.

However, power consumption of an electronic device is growing as functions of the electronic device are upgraded. Users charge electronic devices more frequently. A wired charging manner is mostly adopted in a conventional charging method. When multiple electronic devices are charged simultaneously, various charging wires usually can not be orderly arranged.

Conventional techniques of wireless charging were developed by those skilled in the art. In one conventional technique, a charging plate is used to charge an electronic device. In particular, a coil is arranged in the charging plate, and another coil needs to be correspondingly arranged in the electronic device. A magnetic field is formed in a vicinity of the charging plate when the coil of the charging plate is powered, and an induced current is generated in the coil of the electronic device in the magnetic field, and thus the electronic device is charged.

The electronic devices in existing technology are to be developed towards being thinner and lighter. However, according to the conventional wireless charging method, an additional coil needs to be arranged in an electronic device to generate an induced current. Thus, a volume of the electronic device is inevitably increased, impeding the electronic device from being thinner and lighter.

SUMMARY

This application intends to provide a touch screen, an electronic device, and a wireless charging method, to achieve a wireless charging of an electronic device based on a touch screen, make the electronic device thinner and lighter, and avoid volume increase resulted from an additional coil in the electronic device.

To achieve the above purposes, following solutions are provided in the application.

A touch screen, applied to an electronic device, includes:

a substrate, adapted to carry a touch sensor circuit, where the touch sensor circuit includes a first touch sensor circuit and a second touch sensor circuit;

where the first touch sensor circuit includes multiple conductive lines arranged along a first direction, and the second touch sensor circuit includes multiple conductive lines arranged along a second direction, where the second direction is different from the first direction;

an insulating layer arranged between the first touch sensor circuit and the second touch sensor circuit; and an equivalent switch arranged between the first touch sensor circuit and the second touch sensor circuit, where the first touch sensor circuit and the second touch sensor circuit form the touch sensor circuit in a case that the equivalent switch is off; and the first touch sensor circuit and the second touch sensor circuit form an equivalent coil, and two ends of the equivalent coil are connected to a rechargeable power supply to generate an induced current for charging the rechargeable power supply, in a case that the equivalent switch is on.

An electronic device, includes the foregoing touch screen.

A wireless charging method using the electronic device as described above, includes:

obtaining state information of the electronic device;

determining whether a preset condition is met according to the state information, to obtain a determined result;

controlling the equivalent switch to be on, in a case that the determined result indicates that the preset condition is met.

According to embodiments provided in the application, following technical effects may be achieved.

According to the touch screen, the electronic device, and the wireless charging method provided in the application, an equivalent switch is arranged between the first touch sensor circuit and the second touch sensor circuit; the first touch sensor circuit and the second touch sensor circuit form the touch sensor circuit in a case that the equivalent switch is off; and the first touch sensor circuit and the second touch sensor circuit form an equivalent coil and two ends of the equivalent coil are connected to a rechargeable power supply of the electronic device, in a case that the equivalent switch is on. In this way, the touch sensor circuit on the touch screen can be reused. That is, the touch sensor circuit may be used to form the equivalent coil for generating the inducted current. Thus, a wireless charging of an electronic device is achieved based on a touch screen, the electronic device can be thinner and lighter, and volume increase resulted from an additional coil in the electronic device is avoided.

BRIEF DESCRIPTION OF THE DRAWINGS

To better explain the technical solutions in embodiments of the application or in existing technology, drawings for the embodiments are described below briefly. Apparently, the drawings described below are merely a few embodiments of the application. For those skilled in the art, other drawings may be obtained without paying any creative work, according to these drawings.

FIG. 4 is a diagram of an equivalent coil formed in a case that the equivalent switch in FIG. 3 is on.

DETAILED DESCRIPTION OF EMBODIMENTS

Next, technical solutions in embodiments of the application are clearly and completely described in conjunction with drawings in the embodiments of the application. Apparently, the described embodiments are merely a few, rather than all embodiments of the application. Based on the embodiments in the application, any other embodiment obtained by those skilled in the art without creative work falls within the scope of the application.

For better understanding of the above purpose, features and virtues of the application, the application is further described in detail in conjunction with drawings and embodiments.

A touch screen according to the application is applied to an electronic device. The electronic device may be a cell phone, a tablet computer, etc. The touch screen includes:

a substrate, adapted to carry a touch sensor circuit, where the touch sensor circuit includes a first touch sensor circuit and a second touch sensor circuit;

where the first touch sensor circuit includes multiple conductive lines arranged on the substrate along a first direction, and the second touch sensor circuit includes multiple conductive lines arranged on the substrate along a second direction, where the second direction is different from the first direction; and an insulating layer arranged between the first touch sensor circuit and the second touch sensor circuit.

Figure 1:
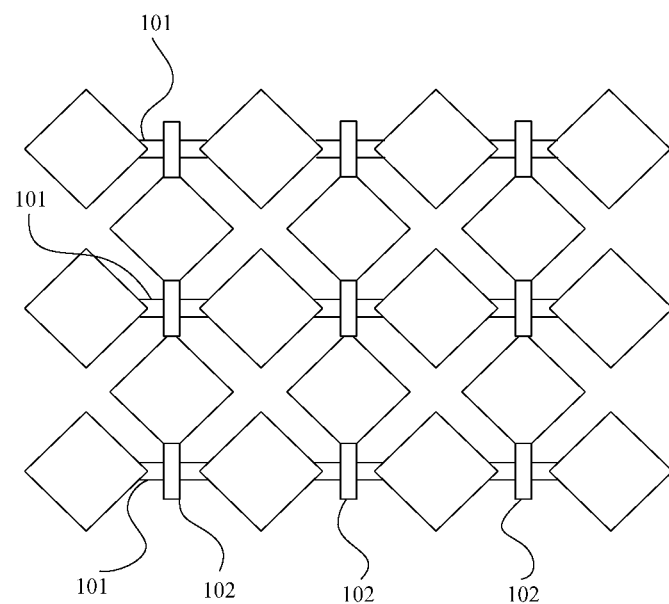
FIG. 1 is a structural diagram of a top view of a touch screen according to an embodiment of the application.

FIG. 1 is a structural diagram of a top view of a touch screen according to the embodiment of the application. As shown in FIG. 1, the first touch sensor circuit 101 includes multiple conductive lines arranged on the substrate along a horizontal direction, and the second touch sensor circuit 102 includes multiple conductive lines arranged on the substrate along a vertical direction. An insulating layer (not shown in FIG. 1) is arranged between the first touch sensor circuit 101 and the second touch sensor circuit 102.

Figure 2:
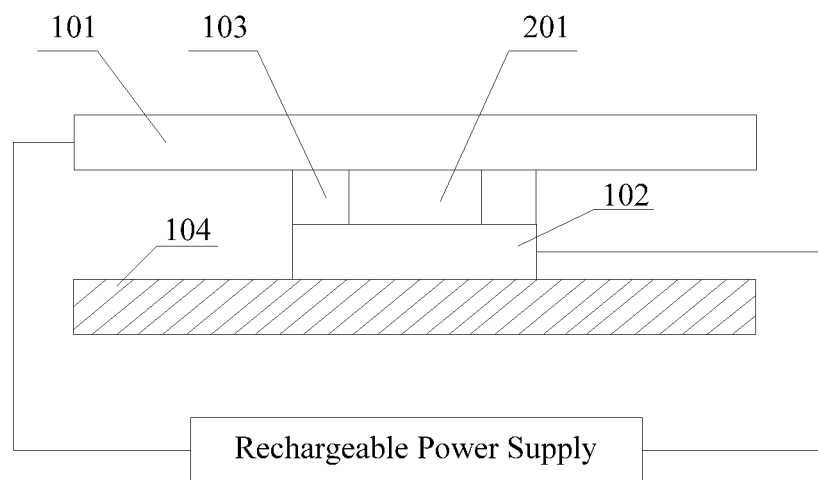
FIG. 2 is a structural diagram of a side cross-section view of a touch screen according to an embodiment of the application.

FIG. 2 is a structural diagram of a side cross-section view of a touch screen according to an embodiment of the application.

As shown in FIG. 2, the insulating layer 103 is arranged between the first touch sensor circuit 101 and the second touch sensor circuit 102. The substrate is arranged at the bottom, to carry the touch sensor circuit.

An equivalent switch 201 is arranged between the first touch sensor circuit 101 and the second touch sensor circuit 102, where the first touch sensor circuit and the second touch sensor circuit form the touch sensor circuit in a case that the equivalent switch 201 is off; and the first touch sensor circuit and the second touch sensor circuit form an equivalent coil, and two ends of the equivalent coil are connected to a rechargeable power supply (not shown in FIG. 2) to generate an induced current for charging the rechargeable power supply, in a case that the equivalent switch 201 is on.

In particular, the equivalent switch 201 can control the first touch sensor circuit 101 and the second touch sensor circuit 102 to be connected or disconnected. When the equivalent switch 201 is off, in FIG. 1, the overlapped parts of the first touch sensor circuit 101 and the second touch sensor circuit 102 are separated by the insulating layer 103, and the first touch sensor circuit 101 and the second touch sensor circuit 102 do not contact. When the equivalent switch 201 is on, in FIG. 1, some places (i.e., the places controlled by the equivalent switch) of the overlapped parts of the first touch sensor circuit 101 and the second touch sensor circuit 102 are connected.

The equivalent switch may be a switch equaled in any form. The equivalent switch, in particular, may be a switch for controlling an overlapped part, or may be a chip for centrally controlling multiple overlapped parts.

When the equivalent switch 201 is off, the first touch sensor circuit and the second touch sensor circuit form the touch sensor circuit. In this case, the touch screen of the electronic device can achieve a touch control function.

When the equivalent switch 201 is on, the first touch sensor circuit and the second touch sensor circuit form an equivalent coil. In this case, the touch screen of the electronic device can sense an external electromagnetic field, and generate an induced current to charge the rechargeable power supply.

In summary, in the embodiment of the application, an equivalent switch is arranged between the first touch sensor circuit and the second touch sensor circuit; the first touch sensor circuit and the second touch sensor circuit form the touch sensor circuit in a case that the equivalent switch is off; and the first touch sensor circuit and the second touch sensor circuit form an equivalent coil, and two ends of the equivalent coil are connected to a rechargeable power supply of the electronic device, in a case that the equivalent switch is on. In this way, the touch sensor circuit on the touch screen can be reused, i.e., an equivalent coil may be used to form the equivalent coil for generating the induced current.

Thus, the wireless charging of the electronic device is achieved based on a touch screen, the electronic device can be thinner and lighter, and volume increase resulted from an additional coil in the electronic device is avoided.

Figure 3:
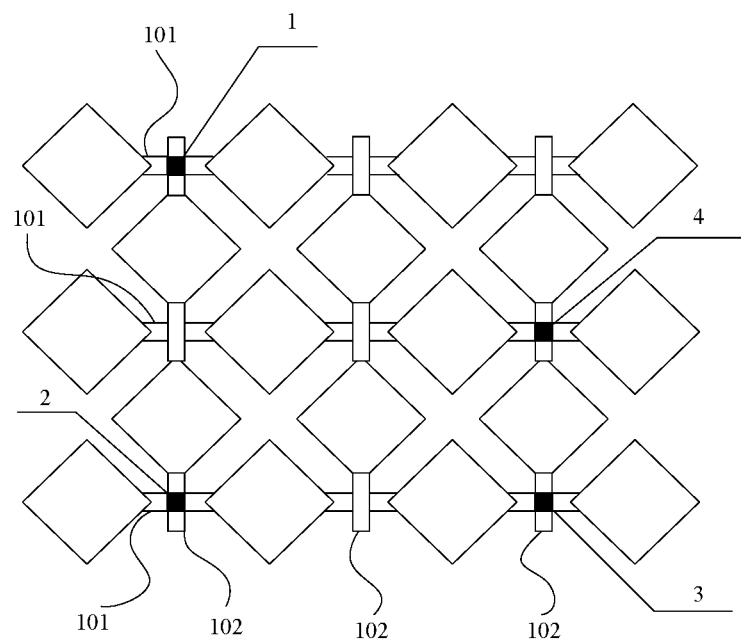
FIG. 3 is a diagram of an implementation of a position for arranging an equivalent switch according to an embodiment of the application.

FIG. 3 is a diagram of an implementation of a position for arranging an equivalent switch according to an embodiment of the application.

As shown in FIG. 3, the equivalent switch may be arranged at a position 1, a position 2, a position 3, and a position 4.

Figure 4:
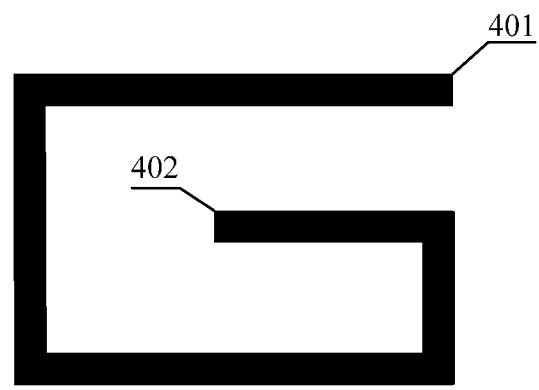

FIG. 4 is a diagram of an equivalent coil formed in a case that the equivalent switch in FIG. 3 is on. As shown in FIG. 4, when the equivalent switch is on, some parts of the first touch sensor circuit and some parts of the second touch sensor circuit, which initially were in a separated state, together form an equivalent coil. A first end 401 and a second end 402 of the equivalent coil may be connected to a rechargeable power supply of the electronic device.

After the first touch sensor circuit and the second touch sensor circuit together form the equivalent coil, the electronic device may be operated in combination with an external charging plate which supports a function of wireless charging, to generate an induced current for charging the rechargeable power supply.

It should be noted that, in practice, the equivalent switch may be arranged at other positions in the electronic device, as long as can control the first touch sensor circuit and the second touch sensor circuit to be connected or disconnected. Hence, an implementation of the equivalent switch may also include: connecting an end with a first lead led out from a first region of the first touch sensor circuit, connecting another end with a second lead led out from a second region of the second touch sensor circuit, and arranging the insulating layer between the first region and the second region.

In a planar circuit diagram of the touch sensor circuit formed by the first touch sensor circuit and the second touch sensor circuit, the first region is overlapped with the second region in the planar circuit diagram. A region where the first region is overlapped with the second region in the planar circuit diagram may be the black region in FIG. 3.

In practice, a chip with a switching control function may be used as the equivalent switch. In this case, the equivalent switch is a controller chip, the first lead and the second lead are connected to the controller chip, and the controller chip controls the first lead and the second lead to be connected or disconnected. That the first lead and the second lead are controlled to be connected by the controller chip indicates that the first lead can be connected to the second lead via the controller chip. That the first lead and the second lead are controlled to be disconnected by the controller chip indicates that the first lead can be disconnected to the second lead via the controller chip.

It should also be noted that, in practice, to achieve automatic control of a charging process of the electronic device, and to improve convenience in the charging process of the electronic device with the touch screen according to the application, the controller chip controls the first lead and the second lead to be connected, by the following processes.

The controller chip controls the first lead and the second lead to be connected, in a case that the electronic device is in a standby state, or in a case that a parameter of an external electric field of the electronic device is larger than a threshold.

The controller chip may detect a state of the electronic device, and control the first lead and the second lead to be connected, when the electronic device is detected in a standby state. A touch control function of the touch screen can not be used when the first touch sensor circuit and the second touch sensor circuit forms the equivalent coil. Therefore, the controller chip controls the first lead and the second lead to be connected, only if the electronic device is in a standby state. Thus, it is avoided affecting a user using the electronic device.

When the electronic device is located in a vicinity of a device which supports the wireless charging, the device which supports the wireless charging generates a strong electric field, and both a voltage parameter and an inductance parameter of the electric field are larger than preset thresholds. Hence, the controller chip may detect a parameter of an external electric field, and control the first lead and the second lead to be connected, when it is detected that the parameter of the external electric field is larger than a threshold. Thus, a wireless charging function can be automatically switched on, when the electronic device approaches a device which supports the wireless charging.

An electronic device is further provided in the application. The electronic device may be a cell phone, a tablet computer, etc. The electronic device includes the touch screen in the embodiment of the application. Because of the touch screen included therein, the touch sensor circuit of the touch screen can be reused in the electronic device in this embodiment of the application, i.e., the touch sensor circuit may be used to form the equivalent coil for generating the inducted current.

Thus, the wireless charging of an electronic device is achieved based on a touch screen, the electronic device can be thinner and lighter, and volume increase resulted from an additional coil in the electronic device is avoided.

A wireless charging method is further provided in the application. The method is applied to an electronic device with a touch screen, where the touch screen is the touch screen according to the embodiment of the application.

The touch screen may include:

a substrate, adapted to carry a touch sensor circuit, where the touch sensor circuit includes a first touch sensor circuit and a second touch sensor circuit;

where the first touch sensor circuit includes multiple conductive lines arranged on the substrate along a first direction, and the second touch sensor circuit includes multiple conductive lines arranged on the substrate along a second direction, where the second direction is different from the first direction;

an insulating layer arranged between the first touch sensor circuit and the second touch sensor circuit; and an equivalent switch arranged between the first touch sensor circuit and the second touch sensor circuit, where the first touch sensor circuit and the second touch sensor circuit form the touch sensor circuit in a case that the equivalent switch is off; and the first touch sensor circuit and the second touch sensor circuit form an equivalent coil, and two ends of the equivalent coil are connected to a rechargeable power supply to generate an induced current for charging the rechargeable power supply, in a case that the equivalent switch is on.

Figure 5:
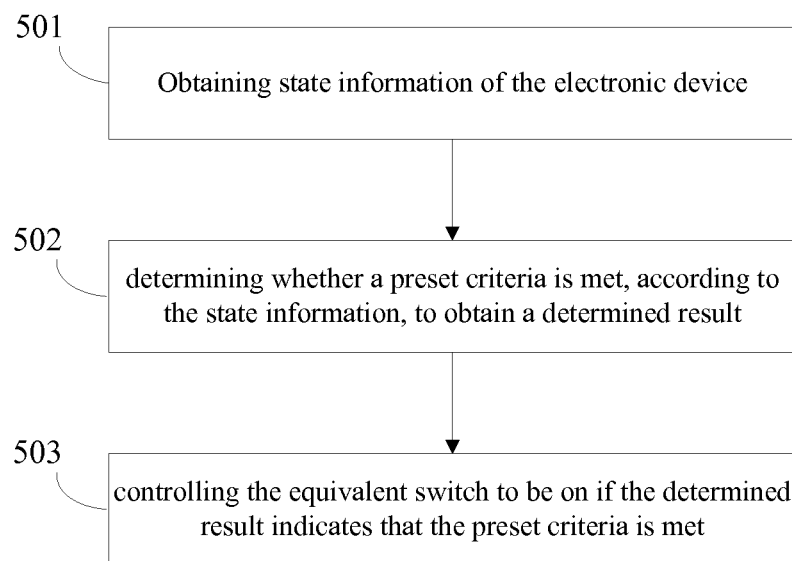
FIG. 5 is a flow chart of an embodiment of a wireless charging method according to the application.

FIG. 5 is a flow chart of an embodiment a wireless charging method according to the application. As shown in FIG. 5, the method may include step 501 to 503.

Step 501 includes: obtaining state information of the electronic device.

The state information may be system state information of the electronic device, or a parameter of an external electric field of the electronic device.

Step 502 includes: determining whether a preset condition is met, according to the state information, to obtain a determined result.

If the state information is the system state information of the electronic device, the determining whether a preset condition is met, includes: determining whether the electronic device is in a standby state.

If the state information is the parameter of the external electric field of the electronic device, the determining whether a preset condition is met, includes: determining whether the parameter of the external electric field is larger than a threshold.

Step 503 includes: controlling the equivalent switch to be on, in a case that the determined result indicates that the preset condition is met.

If the determined result indicates that the preset condition is met, i.e., the electronic device is in a standby state, or the parameter of the external electric field is larger than a threshold, then the equivalent switch can be controlled to be on. Thus, the touch sensor circuits form an equivalent coil, in combination with a device which supports the wireless charging, to perform the wireless charging.

In summary, in the embodiment, the state information of the electronic device is obtained; whether a preset condition is met is determined according to the state information, to obtain a determined result; and the equivalent switch is controlled to be on if the determined result indicates that the preset condition is met. In this way, an automatic control for circuit connection manners of the touch sensor circuit of the touch screen can be achieved. A circuit connection manner of the touch sensor circuit of the touch screen can be automatically switched into a circuit connection manner of an equivalent coil, to provide convenience during the usage of the electronic device in the embodiment of the application.

It should also be noted that, in the wireless charging method according to the embodiment of the application, the equivalent switch may be controlled to be off if the determined result indicates that the preset condition is not met. The electronic device may be used by a user, when the determined result indicates that the preset condition is not met. At this time, the usage of the user may be affected if the circuit connection manner of the touch sensor circuit of the touch screen is switched into the circuit connection manner of an equivalent coil, to provide convenience during the usage of the electronic device in the embodiment of the application. In addition, when the electronic device may be at a position far from the device which supports the wireless charging, and in this case, the wireless charging may be implemented if the circuit connection manner of the touch sensor circuit of the touch screen is switched into the circuit connection manner of an equivalent coil. Therefore, if the determined result indicates that the preset condition is not met, the equivalent switch may be controlled to be off, so that the touch sensor circuit in the touch screen still supports a function of touch input.

Finally, it should also be noted that, in this context, the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

According to the foregoing description, those skilled in the art can understand that the application may be implemented in software and necessary hardware, or may certainly be implemented all in hardware, although the former implementation is preferred. Based on such understanding, all or parts of the technical solutions of the application, which contributes to the background technology, may be embodied in a software product. The computer software product may be stored in a storage medium such as a Read-Only Memory (ROM)/a Random Access Memory (RAM), a magnetic disk, and a compact disk, and include instructions to enable a computer device (which may be a personal computer, a server, or a network device, etc.) to perform the method described in each embodiment or in parts of the embodiment.

The embodiments in the specification are described in a progressive manner, each of which emphasizes the differences from others, and the same or similar elements among the embodiments can be referred to each other.

Particular examples are used in this context to elaborate the principle and the implementations of the application. The description of the embodiments is merely to facilitate understanding the method and core idea of the application. In addition, for those skilled in the art, according to the idea of the application, there may be modifications in particular implementing manner and application range. In summary, the content of the description should not be construed as limit to the application.

The invention claimed is:

1. A touch screen, applied to an electronic device, comprising:
   a substrate, adapted to carry a touch sensor circuit, wherein (i) the touch sensor circuit comprises a first touch sensor circuit and a second touch sensor circuit and (ii) the first touch sensor circuit and the second touch sensor circuit are arranged in different planes that are parallel to the substrate;
   wherein the first touch sensor circuit comprises a plurality of conductive lines arranged along a first direction, and the second touch sensor circuit comprises a plurality of conductive lines arranged along a second direction, wherein the second direction is different from the first direction;
   an insulating layer arranged between the first touch sensor circuit and the second touch sensor circuit; and
   an equivalent switch arranged between the first touch sensor circuit and the second touch sensor circuit, wherein the first touch sensor circuit and the second touch sensor circuit form the touch sensor circuit, in a case that the equivalent switch is off; and the first touch sensor circuit and the second touch sensor circuit form an equivalent coil and two ends of the equivalent coil are connected to a rechargeable power supply to generate an induced current for charging the rechargeable power supply, in a case that the equivalent switch is on.

2. The touch screen according to claim 1, wherein:
   an end of the equivalent switch is connected with a first lead led out from a first region of the first touch sensor circuit, another end of the equivalent switch is connected with a second lead led out from a second region of the second touch sensor circuit, and the insulating layer is arranged between the first region and the second region; and
   the first region is overlapped with the second region overlap, in a planar circuit diagram of the touch sensor circuit formed by the first touch sensor circuit and the second touch sensor circuit.

3. The touch screen according to claim 2, wherein the equivalent switch is a controller chip, the first lead and the second lead are connected to the controller chip, and the controller chip is adapted to control the first lead and the second lead to be connected or disconnected.

4. The touch screen according to claim 3, wherein the controller chip is further adapted to control the first lead and the second lead to be connected, in a case that the electronic device is in a standby state, or in a case that a parameter of an external electric field of the electronic device is larger than a threshold.

5. An electronic device, comprising a touch screen, wherein the touch screen is applied to an electronic device and comprises:
   a substrate, adapted to carry a touch sensor circuit, wherein (i) the touch sensor circuit comprises
   a first touch sensor circuit and a second touch sensor circuit and (ii) the first touch sensor circuit and the second touch sensor circuit are arranged in different planes that are parallel to the substrate;
   wherein the first touch sensor circuit comprises a plurality of conductive lines arranged along a first direction, and the second touch sensor circuit comprises a plurality of conductive lines arranged along a second direction, wherein the second direction is different from the first direction;
   an insulating layer arranged between the first touch sensor circuit and the second touch sensor circuit; and
   an equivalent switch arranged between the first touch sensor circuit and the second touch sensor circuit, wherein the first touch sensor circuit and the second touch sensor circuit form the touch sensor circuit, in a case that the equivalent switch is off; and the first touch sensor circuit and the second touch sensor circuit form an equivalent coil and two ends of the equivalent coil are connected to a rechargeable power supply to generate an induced current for charging the rechargeable power supply, in a case that the equivalent switch is on.

6. The electronic device according to claim 5, wherein an end of the equivalent switch is connected with a first lead led out from a first region of the first touch sensor circuit, another end of the equivalent switch is connected with a second lead led out from a second region of the second touch sensor circuit, and the insulating layer is arranged between the first region and the second region; and the first region is overlapped with the second region overlap, in a planar circuit diagram of the touch sensor circuit formed by the first touch sensor circuit and the second touch sensor circuit.

7. The electronic device according to claim 6, wherein the equivalent switch is a controller chip, the first lead and the second lead are connected to the controller chip, and the controller chip is adapted to control the first lead and the second lead to be connected or disconnected.

8. The electronic device according to claim 7, wherein the controller chip is further adapted to control the first lead and the second lead to be connected, in a case that the electronic device is in a standby state, or in a case that a parameter of an external electric field of the electronic device is larger than a threshold.

9. A wireless charging method using the electronic device according to claim 5, comprising:
  obtaining state information of the electronic device;
  determining whether a preset condition is met, according to the state information, to obtain a determined result; and
  controlling the equivalent switch to be on, in a case that the determined result indicates that the preset condition is met.

10. The method according to claim 9, wherein:
the obtaining state information of the electronic device comprises:
  obtaining system state information of the electronic device; and
the determining whether a preset condition is met comprises:
  determining whether the electronic device is in a standby state.

11. The method according to claim 9, wherein:
the obtaining state information of the electronic device comprises:
  obtaining a parameter of an external electric field of the electronic device; and
the determining whether a preset condition is met comprises:
  determining whether the parameter of the external electric field is larger than a threshold.

12. The method according to claim 9, further comprising:
controlling the equivalent switch to be off, in a case that the determined result indicates that the preset condition is not met.

* * * * *